United States Patent

Smith

[11] Patent Number: 5,760,978
[45] Date of Patent: Jun. 2, 1998

[54] DUAL REAR VIEW MIRROR SYSTEM

[76] Inventor: Ronnie P. Smith, 4140 Knox School Rd., Homeworth, Ohio 44634

[21] Appl. No.: 647,670

[22] Filed: May 15, 1996

[51] Int. Cl.⁶ .............................. G02B 5/08; G02B 7/182
[52] U.S. Cl. .............................................. 359/855; 359/865
[58] Field of Search ................................ 359/850, 855, 359/865, 866

[56] References Cited

U.S. PATENT DOCUMENTS

| | | | |
|---|---|---|---|
| 4,504,118 | 3/1985 | Harig | 359/865 |
| 4,643,544 | 2/1987 | Loughran | 359/866 |
| 4,859,046 | 8/1989 | Traynor et al. | 359/866 |
| 5,115,352 | 5/1992 | do Espirito Santo | 359/855 |
| 5,295,021 | 3/1994 | Swanson | 359/850 |
| 5,479,297 | 12/1995 | Summers | 359/841 |

FOREIGN PATENT DOCUMENTS

| | | | |
|---|---|---|---|
| 652 829 | 11/1962 | Canada | 359/865 |
| 2 040 843 | 9/1980 | United Kingdom | 359/866 |

*Primary Examiner*—Paul M. Dzierzynski
*Assistant Examiner*—Mark A. Robinson

[57] ABSTRACT

The present invention relates to a positioning system for a rear view mirror. More specifically, the invention includes a first and second mirror joined together by an elongate resilient seam. Each of the mirrors is controllable by way of a positioning system. Each of the positioning systems includes a cam controlled by a cable.

1 Claim, 3 Drawing Sheets

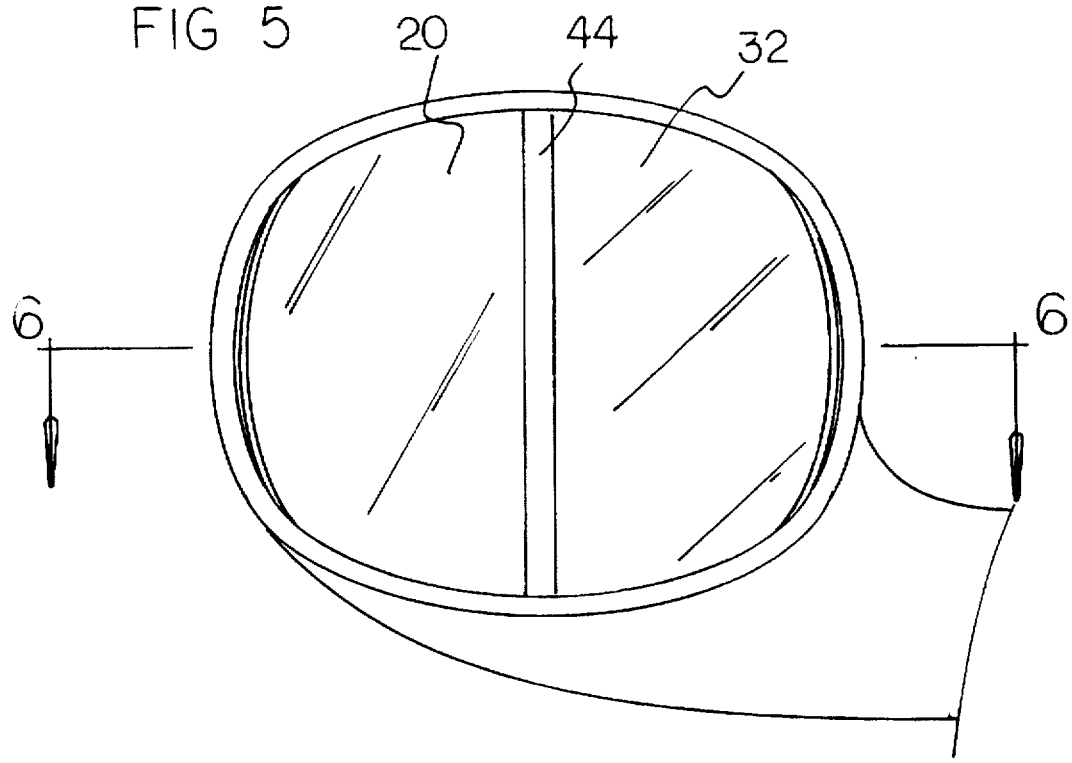
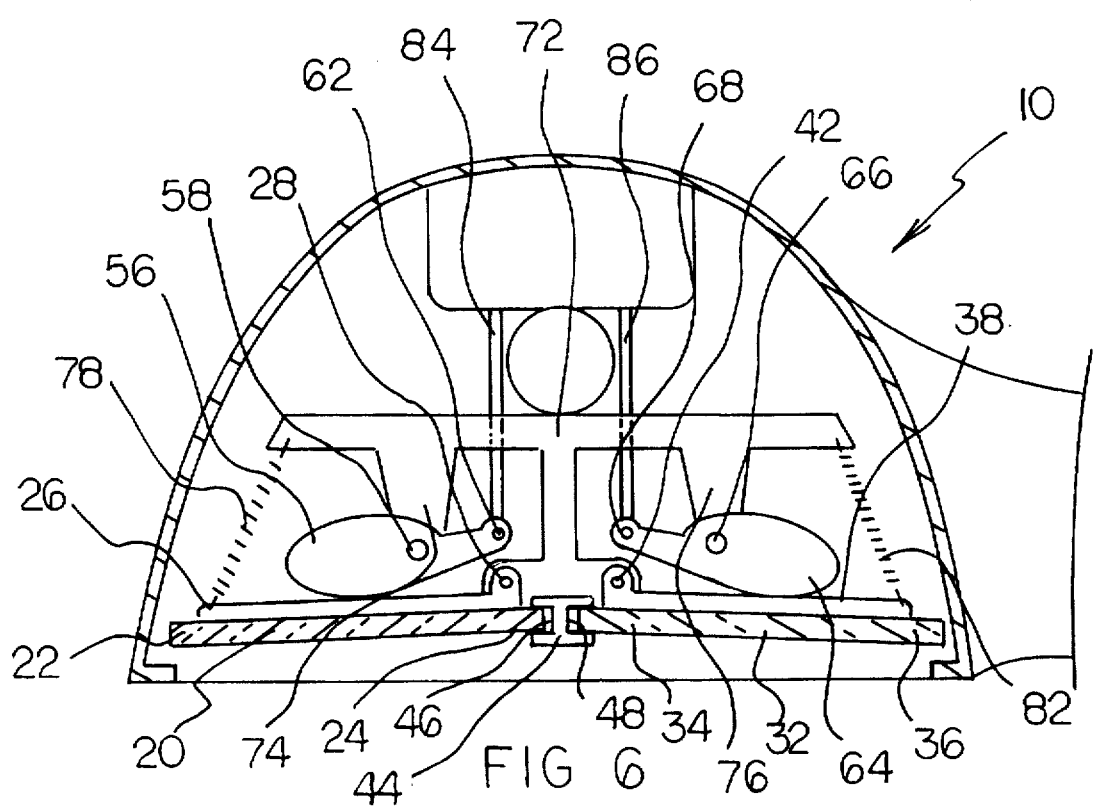

5,760,978

DUAL REAR VIEW MIRROR SYSTEM

BACKGROUND OF THE INVENTION

1. Field of the Invention

The present invention relates to dual rear view mirror system and more particularly pertains to a system for positioning two mirrors.

2. Description of the Prior Art

The use of wide angle mirror attachments is known in the prior art. More specifically, wide angle mirror attachments heretofore devised and utilized for the purpose of increasing the range of rearward vision are known to consist basically of familiar, expected, and obvious structural configurations, notwithstanding the myriad of designs encompassed by the crowded prior art which has been developed for the fulfillment of countless objectives and requirements.

For example U.S. Pat. No. 5,153,781 to Brandt discloses a rear view mirror assembly for motor vehicles and the like. Furthermore, U.S. Pat. Nos. 5,198,938 to Ward and Des. 343,378 to Ledford each disclose a wide angle mirror for a vehicle. Additionally, U.S. Pat. No. 5,307,211 to Schmidt et al. discloses a truncated convex vehicular mirror surface.; U.S. Pat. No. 5,424,875 to Davis, II discloses a motor vehicle safety mirror; U.S. Pat. No. 5,313,337 to Byers discloses an attachable vehicle mirror.

In this respect, the dual rear view mirror system according to the present invention substantially departs from the conventional concepts and designs of the prior art, and in doing so provides an apparatus primarily developed for the purpose of easily positioning two rear view mirrors.

Therefore, it can be appreciated that there exists a continuing need for new and improved dual rear view mirror system which can be used for giving the user two different ranges of rearward vision. In this regard, the present invention substantially fulfills this need.

SUMMARY OF THE INVENTION

In view of the foregoing disadvantages inherent in the known types of wide angle mirror attachments now present in the prior art, the present invention provides an improved dual rear view mirror system. As such, the general purpose of the present invention, which will be described subsequently in greater detail, is to provide a new and improved dual rear view mirror system and method which has all the advantages of the prior art and none of the disadvantages.

To attain this, the present invention essentially comprises a housing and positioning system for a dual review mirror. This system comprises a first mirror having a front reflective surface and a rear nonreflective surface, a first edge and a second edge, and a positioning plate secured to the rear nonreflective surface. The positioning plate has a pivot point proximate the second edge of the mirror. The system also comprises a second mirror having a front reflective surface and a rear nonreflective surface, a first edge and a second edge, and a positioning plate secured to the rear nonreflective surface. This positioning plate has a pivot point proximate the first edge of the mirror. An elongate resilient seam is employed in interconnecting the two mirrors. The seam has a first side, and a second side, a first pair of flexible spaced walls running the length of the first side, wherein the first pair of spaced walls forms a first channel, a second pair of flexible spaced walls running the length of the second side, wherein the second pair of spaced walls forms a second channel. The second side of the first mirror is positioned within the first channel at a distance away from the first side of the seam, furthermore ,the first side of the second mirror is positioned within the second channel at a distance away from the second side of the seam. The system also includes a positioning means for selectively positioning either of the two mirrors. The positioning means comprises a first cam having a first side and a second side, a first pivot point positioned intermediate the first and second sides, and a second pivot point positioned proximate the second side. The first cam contacts the positioning plate of the first mirror. Likewise, the positioning system includes a second cam having a first side and a second side, a first pivot point positioned intermediate the first and second sides, and a second pivot point positioned proximate the first side. The second cam contacts the positioning plate of the second mirror. Furthermore, the positioning system includes a cam support having a first cam securing portion pivotally secured to the first pivot point of the first cam, and a second cam securing portion pivotally secured to the first pivot point of the second cam. Furthermore, a first return spring serves to interconnect the cam support and the first mirror. Likewise, a second return spring serves to interconnect the cam support and the second mirror. A first control cable is pivotally secured to the second pivot point of the first cam. Likewise, a second control cable is pivotally secured to the second pivot point of the second cam. The cam support is additionally pivotally interconnected to the pivot point of the positioning plate of the first mirror and to the pivot point of the positioning plate of the second mirror.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved dual rear view mirror system which have all the advantages of the prior art wide angle mirror attachments and none of the disadvantages.

It is another object of the present invention to provide new and improved dual rear view mirror system which may be easily and efficiently manufactured and marketed.

It is further object of the present invention to provide new and improved dual rear view mirror system which are of durable and reliable constructions.

An even further object of the present invention is to provide new and improved dual rear view mirror system which are susceptible of a low cost of manufacture with regard to both materials and labor, and which accordingly are then susceptible of low prices of sale to the consuming public, thereby making such dual rear view mirror system economically available to the buying public.

Still yet another object of the present invention is to provide new and improved dual rear view mirror system which provide in the apparatuses and methods of the prior art some of the advantages thereof, while simultaneously overcoming some of the disadvantages normally associated therewith.

Even still another object of the present invention is to enable the user to effect two different extents of rearward vision.

Lastly, it is an object of the present invention to provide new and improved positioning system for a rear view mirror. More specifically, the invention includes a first and second mirror joined together by an elongate resilient seam. Each of the mirrors is controllable by way of a positioning system. Each of the positioning systems includes a cam controlled by a cable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a view of the first embodiment of the present invention.

FIG. 6 is a sectional view taken along line 6—6 of FIG. 5.

The same reference numerals refer to the same parts through the various Figures.

DESCRIPTION OF THE PREFERRED EMBODIMENT

Figure 1:
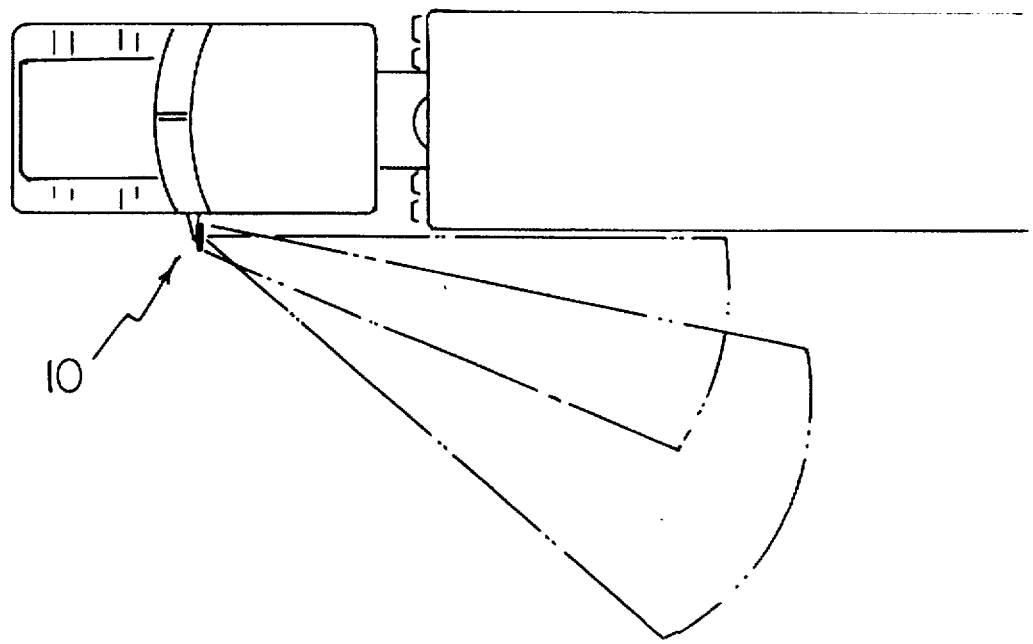
FIG. 1 is an illustration of the second embodiment of the present invention in use.
Figure 2:
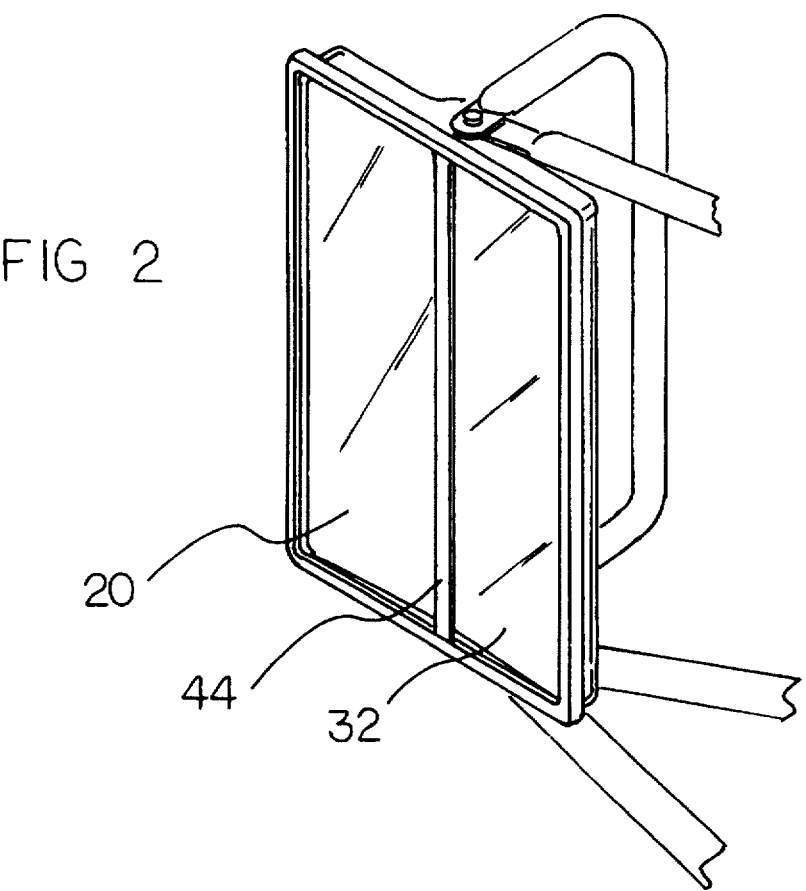
FIG. 2 is a perspective illustration of the second embodiment of the present invention.
Figure 3:
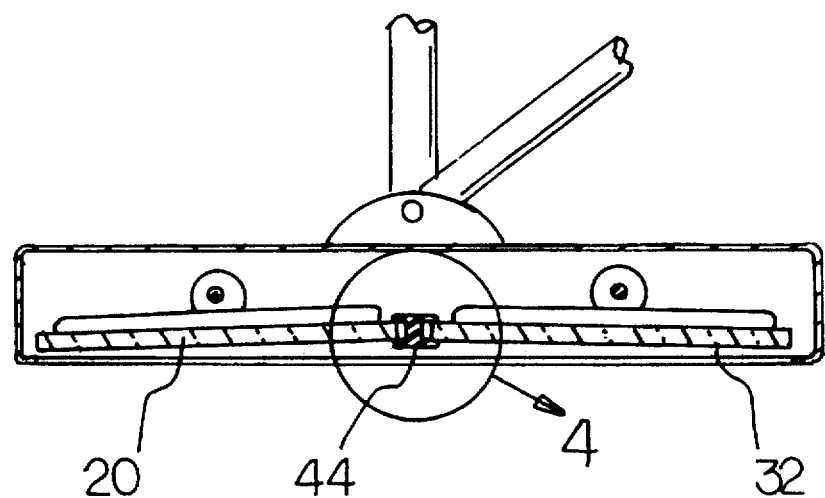
FIG. 3 is a sectional view of the second embodiment of the present invention.
Figure 4:
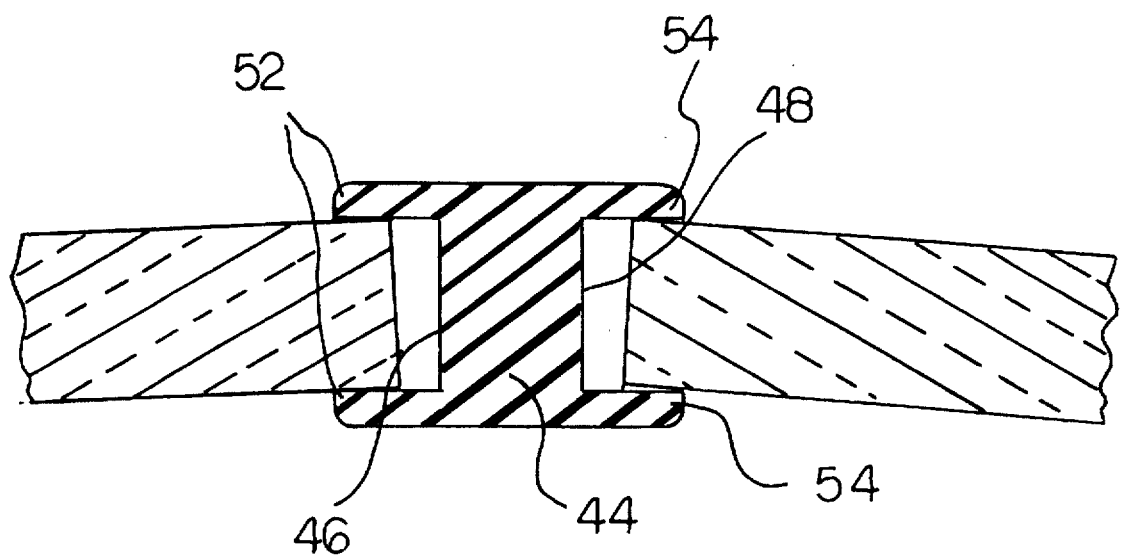
FIG. 4 is a detailed view taken from FIG. 3.

With reference now to the drawings, and in particular to FIG. 1 thereof, the preferred embodiment of the new and improved dual rear view mirror system embodying the principles and concepts of the present invention and generally designated by the reference numeral 10 will be described.

The present invention relates to a position system for a rear view mirror. More specifically, the invention includes a first and second mirror joined together by an elongate resilient seam. Each of the mirrors is controllable by way of a positioning system. Each of the positioning systems includes a cam controlled by a cable. The various components of the present invention, and the manner in which they interrelate, will be described in greater detail hereinafter.

The dual rear view mirror assembly of the present invention includes a first mirror 20 which is defined by a front reflective surface and a rear nonreflective surface, a first free edge 22 and a second edge 24. As illustrated in FIG. 6, a positioning plate 26 is secured to the rear nonreflective surface of the first mirror 20. This positioning plate includes a pivot point 28 formed proximate the second edge 24 of the mirror. The function of this positioning plate 26 will be described in greater detail hereinafter.

The second mirror 32 employed in the present invention is similarly defined by a front reflective surface, a rear nonreflective surface, a first edge 34 and a second free edge 36. Furthermore, a positioning plate 38 is secured to the rear nonreflective surface of the second mirror 32. This positioning plate includes a pivot point 42 formed proximate the first edge 34 of the mirror. The function of this positioning plate 38 will be described in greater detail hereinafter.

Again with reference to FIG. 6, an elongate resilient seam 44 is employed in interconnecting the first and second mirrors. This seam 44 is defined by a first side 46, a second side 48, and further by a first pair of flexible spaced 52 walls running the length of the first side 46, and by a second pair of flexible spaced walls 54 running the length of the second side 48. These first and second pairs of spaced walls each form a first channel upon their respective side of the seam 44. The second side 24 of the first mirror 20 is positioned within the first channel at a distance away from the first side 46 of the seam 44. Likewise, the first side 34 of the second mirror 32 is positioned within the second channel at a distance away from the second side 48 of the seam 44. The spacing between the edge of each mirror and the side of the seam 44 affords the dual mirror assembly a degree of flexibility.

The positioning system employed in conjunction with each mirror will next be described. The positioning system of the present invention allows the user to selectively position either of the two mirrors. The positioning system utilizes a first cam 56, which is defined by a first side and a second side, and further by a first pivot point 58 positioned intermediate the first and second sides. Furthermore, a second pivot 62 point is positioned proximate the second side of the first cam 56. This first cam 56 contacts the positioning plate of the first mirror 20. Through this contact, the first cam 56 can manipulate the first mirror 20.

Likewise, the positioning system utilizes a second cam 64. This second cam 64 is defined by a first side and a second side, and further by a first pivot point 66 positioned intermediate the first and second sides of the second cam 64. Furthermore, a second pivot point 68 is positioned proximate the first side. This second cam 64 contacts the positioning plate of the second mirror 32. This contact enables movement of the second mirror 32 via the second cam 64.

The two cams of the positioning system are interconnected via a cam support 72. This cam support 72 includes a first cam securing portion 74 pivotally secured to the first pivot point of the first cam 56, and a second cam securing portion 76 pivotally secured to the first pivot point of the second cam 64. This cam support 72 is illustrated in FIG. 6. A first return spring 78 serves to interconnect the cam support 72 and the first mirror 20. In a similar fashion, a second return spring 82 serves to interconnect the cam support 72 and the second mirror 32. These two springs function in biasing the mirrors to a first orientation. Furthermore, a first control cable 84 is pivotally secured to the second pivot point of the first cam 56. Likewise, a second control cable 86 is pivotally secured to the second pivot point of the second cam 64. These cables can be interconnected to user controls within the interior of the vehicle. It is through the two cables that a user effects the positioning of the mirrors. The cam support 72, in addition to being pivotally interconnected to the cams, is also pivotally interconnected to the two positioning plates. More specifically, the cam support 72 is secured to the pivot point 28 of the positioning plate of the first mirror 20 and to the pivot point 42 of the positioning plate of the second mirror 32.

Although the present invention has been described in conjunction with a positioning system, the dual rear view mirror can be utilized without a positioning system. This embodiment is illustrated in FIGS. 1–4. In this embodiment the two mirrors are employed and interconnected by way of the resilient seam 44. However, positioning of the mirrors is manually achieved.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. A housing and positioning system for a dual rearview mirror, the system comprising in combination:

a first mirror having a front reflective surface and a rear nonreflective surface, a first free edge and a second edge, a positioning plate secured to the rear nonreflective surface, the positioning plate having a pivot point proximate the second edge of the mirror;

a second mirror having a front reflective surface and a rear nonreflective surface, a first edge and a second free edge, a positioning plate secured to the rear nonreflective surface, the positioning plate having a pivot point proximate the first edge of the mirror;

a elongate resilient seam having a first side, and a second side, a first pair of flexible spaced walls running the length of the first side, the first pair of spaced walls forming a first channel, a second pair of flexible spaced walls running the length of the second side, the second pair of spaced walls forming a second channel, the second side of the first mirror positioned within the first channel at a distance away from the first side of the seam,the distance providing a degree of flexibility to the first free edge of the first mirror, the first side of the second mirror positioned within the second channel at a distance away from the second side of the seam the distance providing a degree of flexibility to the second free edge of the second mirror;

positioning means for selectively positioning either of the two mirrors, the positioning means comprising;

a first cam having a first side and a second side, a first pivot point positioned intermediate the first and second sides, a second pivot point positioned proximate the second side, the first cam contacting the positioning plate of the first mirror;

a second cam having a first side and a second side, a first pivot point positioned intermediate the first and second sides, a second pivot point positioned proximate the first side, the second cam contacting the positioning plate of the second mirror;

a cam support having a first cam securing portion pivotally secured to the first pivot point of the first cam, and a second cam securing portion pivotally secured to the first pivot point of the second cam, a first return spring interconnecting the cam support and the first mirror, a second return spring interconnecting the cam support and the second mirror, a first control cable pivotally secured to the second pivot point of the first cam, a second control cable pivotally secured to the second pivot point of the second cam, the cam support pivotally interconnected to the pivot point of the positioning plate of the first mirror and to the pivot point of the positioning plate of the second mirror.

* * * * *